US009667370B2

(12) United States Patent
Tzeng et al.

(10) Patent No.: US 9,667,370 B2
(45) Date of Patent: May 30, 2017

(54) COMMUNICATION DEVICE WITH PEER-TO-PEER ASSIST TO PROVIDE SYNCHRONIZATION

(71) Applicant: Avago Technologies General IP (Singapore) Pte. Ltd., Singapore (SG)

(72) Inventors: Shr-Jie Tzeng, Cupertino, CA (US); Josef Lo, Irvine, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 96 days.

(21) Appl. No.: 14/477,605

(22) Filed: Sep. 4, 2014

(65) Prior Publication Data

US 2015/0063375 A1    Mar. 5, 2015

Related U.S. Application Data

(60) Provisional application No. 61/874,211, filed on Sep. 5, 2013.

(51) Int. Cl.
*H04J 3/06* (2006.01)
*H04L 29/06* (2006.01)
*H04L 12/54* (2013.01)
*H04L 12/841* (2013.01)

(52) U.S. Cl.
CPC .......... *H04J 3/0667* (2013.01); *H04J 3/0673* (2013.01); *H04L 12/56* (2013.01); *H04L 69/22* (2013.01); *H04L 69/28* (2013.01); *H04L 47/28* (2013.01)

(58) Field of Classification Search
CPC ....... H04J 3/0673; H04J 3/0667; H04L 12/56; H04L 69/22

USPC .................. 370/350, 503, 512, 474
See application file for complete search history.

(56) References Cited

U.S. PATENT DOCUMENTS

| 7,689,854 B2 | 3/2010 | Ilnicki et al. | |
|---|---|---|---|
| 8,576,883 B2 | 11/2013 | Lansdowne | |
| 8,718,482 B1 | 5/2014 | Roberts et al. | |
| 2009/0210725 A1* | 8/2009 | Kim | H04L 12/10 713/300 |
| 2012/0026041 A1* | 2/2012 | Murdock | G01S 5/0289 342/387 |
| 2012/0128011 A1* | 5/2012 | Holmeide | H04L 69/28 370/474 |
| 2013/0028265 A1* | 1/2013 | Ronchetti | H04J 3/0697 370/400 |
| 2013/0163617 A1* | 6/2013 | Chandra | H04J 3/0667 370/503 |
| 2013/0301634 A1* | 11/2013 | Ehlers | H04L 12/4625 370/350 |
| 2013/0308658 A1* | 11/2013 | Le Pallec | H04J 3/0697 370/503 |

(Continued)

*Primary Examiner* — Chuong T Ho
(74) *Attorney, Agent, or Firm* — Sterne, Kessler, Goldstein & Fox P.L.L.C.

(57) ABSTRACT

A system and method for timing synchronization between network nodes. The timing synchronization can conform to the Precision Time Protocol (PTP) as defined in the IEEE 1588 protocol. The timing synchronization can include the insertion of ingress and/or egress timestamps into packets. For example, timestamps can be inserted into reserved fields of the header of a packet. The timing synchronization can also include the utilization of one or more reserved fields to initiate the generation of a timestamp upon the transmission of the packet and/or the retrieval of a previously stored timestamp.

19 Claims, 6 Drawing Sheets

(56) References Cited

U.S. PATENT DOCUMENTS

| | | | |
|---|---|---|---|
| 2013/0322872 A1* | 12/2013 | Jobert | H04B 10/073 398/25 |
| 2014/0122755 A1* | 5/2014 | Chandra | G06F 13/4022 710/106 |
| 2014/0177653 A1 | 6/2014 | Tzeng | |
| 2014/0226683 A1* | 8/2014 | Castiel | H04L 12/64 370/474 |
| 2016/0043823 A1* | 2/2016 | Zhao | H04J 3/0697 370/350 |

* cited by examiner

COMMUNICATION DEVICE WITH PEER-TO-PEER ASSIST TO PROVIDE SYNCHRONIZATION

CROSS REFERENCE TO RELATED APPLICATIONS

This patent application claims the benefit of U.S. Provisional Patent Application No. 61/874,211, filed Sep. 5, 2013, entitled "Peer-to-Peer Assistant to Improve IEEE 1588 System Performance," which is incorporated herein by reference in its entirety.

BACKGROUND

Field

This application relates generally to network synchronization, including timing and/or frequency synchronization between two or more network entities.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1A:
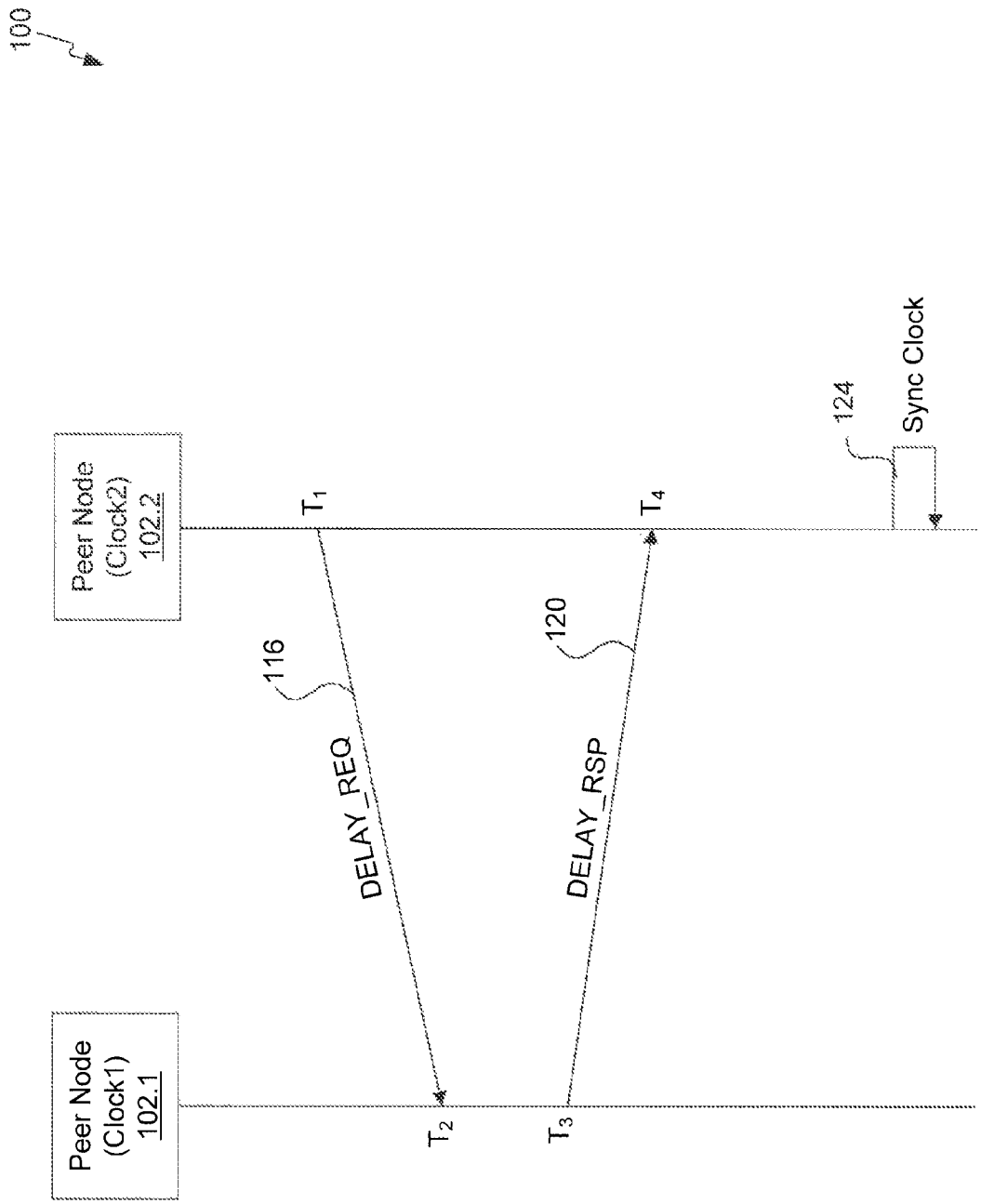
FIG. 1A illustrates an example message sequence for timing synchronization according to an exemplary embodiment of the present disclosure.

Timing and frequency synchronization among network entities can be used to improve network performance. In exemplary embodiments of the present disclosure, the synchronization of network entities can be implemented using, for example, the Precision Time Protocol (PTP). The PTP is further defined in the Institute of Electrical and Electronics Engineers (IEEE) 1588 protocol, which is incorporated herein by reference in its entirety.

The synchronization of network entities is not limited to the PTP, and exemplary embodiments can utilizes one or more other well-known synchronization protocols, standards and/or methodologies—such as, for example, the Network Time Protocol (NTP), the Synchronous Ethernet (SyncE) standard as defined in International Telecommunication Union Telecommunication Standardization Sector (ITU-T) G.8262/Y.1362, "Timing Characteristics of a Synchronous Ethernet Equipment Slave Clock," published July 2010, synchronization techniques using Global Navigation Satellite Systems (GNSS), and/or one or more other well-known synchronization protocols, standards and/or methodologies as would be understood by those of ordinary skill in the relevant arts without departing from the spirit and scope of the present disclosure. Each of these protocols and/or standards is incorporated herein by reference in its entirety.

The IEEE 1588 protocol utilizes packet exchanges between network entities (network nodes). In peer-to-peer network configurations, the one or more of the network entities can be defined as a first peer node, a second peer node, etc. In Wide Area Network (WAN) and/or Local Area Network (LAN) configurations, the network entities can be defined as peer nodes, or as a master/slave (also referred to as master nodes and slave nodes, respectively). In operation, a peer node can be configured to synchronize its clock to the clock of another peer node. To enhance fault tolerance, an election process may determine one among a plurality of other peer nodes to provide the accurate clock at any particular instant to the peer node. In master/slave configurations, the node that is selected to provide the accurate clock is referred to as a grandmaster (GM) node. The clock of the grandmaster can be referred to as the "grandmaster clock."

In IEEE 1588 protocol implementations, network interfaces (e.g., ports) of the network nodes can be configured to take accurate timestamps of selected packet ingress and/or egress packets, and to manage synchronized time. To improve accuracy of synchronization, timestamps can be generated at, for example, the edge of the physical (PHY) layer for the network interface(s) before the packet is transmitted to (or received from) another network node via the network medium (e.g., communication channel). In this example, by reducing time between when a timestamp is generated and when a corresponding packet is transmitted by the network node (or received by the network node), the accuracy of the timestamp can be increased.

In implementations with one or more intermediate network nodes between two network nodes performing synchronization (e.g., where packets traverses multiple hops from a source to a destination), the network nodes can be configured to determine packet queuing delays at the intermediate nodes. In these examples, the intermediate node(s) can be configured to utilize a transparent clock (TC) to measure the residence time (e.g., the. queuing delay) that the packets experience at the intermediate node itself, and may record that residence time in respective packets. In operation, the destination network node can be configured to utilize the residence time information within the received packet to eliminate any synchronization error attributable to the queuing delay of the intermediate node(s).

Exemplary embodiments of the present disclosure provide for timing synchronization between network entities (e.g., peer nodes) connected to a network. One or more exemplary embodiments can conform to the PTP and/or IEEE 1588 protocol in a packet-switched network. In an exemplary embodiment, the egress timestamp of an outgoing message can be saved in a memory associated with the physical interface through which the message egresses, and upon receiving a response message corresponding to the transmitted message, the saved egress timestamp is recorded in the header of the response message before the response message is passed up the protocol stack. The egress timestamp corresponds to the time the message is transmitted on the physical network medium from the physical interface. A similar process can be performed for ingress timestamps of an incoming message, where an egress timestamp correspond to the time the message is received. In operation, the egress and/or ingress timestamps can be inserted in, for example, a field in the header of selected protocol packets so that it can be communicated inband. By storing the egress and/or ingress timestamps in the header, the exemplary embodiments can reduce and/or eliminate the utilization of one more of host interfaces—such as, for example, a Media Independent Interface (MII) and/or a Management Data Input/Output (MDIO) interface—to access a memory associated with the physical interface to obtain one or more timestamps. Timing synchronization between network entities is discussed in more detail in U.S. patent application Ser. No. 13/722,985, filed Dec. 20, 2012, which is incorporated herein by reference in its entirety.

FIG. 1A illustrates a sequence diagram 100 of a message exchange for timing synchronization according to an exemplary embodiment of the present disclosure. The illustrated peer-to-peer message exchange involves two nodes: a first peer node 102.1 having a first clock (CLOCK1) and a second peer node 102.2 having a second clock (CLOCK2) to be synchronized with the first clock of the first peer node 102.1. Each of the nodes 102 can be configured to communicate with our more other nodes 102 using one or more wired communication protocols, standards and/or techniques—such as, for example (but not limited to), the Ethernet standard as defined in IEEE 802.3, one or more fiber optical networks, and/or one or more other well-known wired communication protocols, standards, and/or techniques as would be understood by those of ordinary skill in the relevant art(s) without departing from the spirit and scope of the present disclosure. Each of these wired communication standards and/or protocols are incorporated by reference in its entirety. The communication between nodes is not limited to wired communications and can use one or more wireless communication protocols, standards and/or techniques—such as, for example (but not limited to), Long Term Evolution (LTE), Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16), Wireless Local Area Network(s) (WLAN) (IEEE 802.11), Bluetooth (IEEE 802.15.1 and Bluetooth Special Interest Group (SIG)), Near-field Communication (NFC) (ISO/IEC 18092), ZigBee (IEEE 802.15.4), Radio-frequency identification (RFID), one or more satellite communication networks, infrared communications, and/or one or more other well-known wireless communication protocols, standards, and/or techniques as would be understood by those of ordinary skill in the relevant art(s) without departing from the spirit and scope of the present disclosure. Each of these wireless communication standards and/or protocols is incorporated by reference in its entirety.

In operation, the message exchange begins with the second peer node 102.2 generating and transmitting a delay request (DELAY_REQ) packet 116 to the first peer node 102.1. The DELAY_REQ packet 116 can include a timestamp T1 that represents the time that the DELAY_REQ packet 116 was transmitted by the second peer node 102.2 onto the network (e.g., the egress start of packet time). The timestamp T1 can be included in, for example, the body of the DELAY_REQ packet 116.

In an exemplary embodiment, the timestamp T1 is captured at or substantially at the time at which the DELAY_REQ packet 116 is transmitted onto the communication channel of the network. In this example, the second peer node 102.2 can utilize hardware at or substantially close to its network interface to capture the timestamp, thereby reducing and/or eliminating a difference in time between the generation of the timestamp and the transmission time of the DELAY_REQ packet 116 onto communication channel of the network. In an exemplary embodiment, where the timestamp T1 is captured close to the network interface at the start of the generation of the DELAY_REQ packet 116, the timestamp T1 may be included in the body of the DELAY_REQ packet 116 just before the DELAY_REQ packet 116 has completed transmission. Conversely, if the timestamp is captured before the transmission of the DELAY_REQ packet 116 and away from the network interface (e.g., at the Media Access Control (MAC) layer), the captured timestamp in the DELAY_REQ packet 116 can be an approximation of the actual egress time of the DELAY_REQ packet 116 due to the delay between the generation of the timestamp and the transmission of the DELAY_REQ packet 116. For example, in exemplary embodiments whose communication channel conforms to, for example, the Ethernet standard, the actual transmission of the DELAY_REQ packet 116 (i.e., the time at which the transmission of the packet from the network interface onto the network is completed) can be dependent on, for example, the collision sense multiple access/collision detection (CSMA/CD) protocol, which can substantially differ from a timestamp of the DELAY_REQ packet 116 generated before the actual transmission.

In an exemplary embodiment, DELAY_REQ packet 116 may include a correction value that represents a delay (e.g., a queuing delay) experienced by the DELAY_REQ packet 116 at one or more intermediate nodes (not shown). The queuing delay may be determined by the intermediate node (s) by any internal mechanism. For example, a timestamp may be taken upon ingress of the DELAY_REQ packet 116 to intermediate node(s). A second timestamp can be taken upon egress of the DELAY_REQ packet 116 from intermediate nodes, and the difference of the timestamps may be determined as the delay (also referred to as "residence time") at intermediate node. The delay can be included in the DELAY_REQ packet 116 as the correction value. In an exemplary embodiment, the correction value can be included as a field in the header of the DELAY_REQ packet 116.

When the DELAY_REQ packet 116 reaches the first peer node 102.1, the first peer node 102.1 can be configured to generate a timestamp T2 upon ingress of the DELAY_REQ packet 116. The timestamp T2 represents the ingress start of packet time for the DELAY_REQ packet 116 at the first peer node 102.1. Similar to the generation of timestamp T1 by the second peer node 102.2, timestamp T2 can be generated at or substantially close to the network interface of the first peer node 102.1 so as to produce a more accurate timestamp T2. In an exemplary embodiment, the timestamp T2 is recorded in the header of the DELAY_REQ packet 116. The DELAY_REQ packet 116, which includes timestamps T1 and T2, can be forwarded up the protocol stack of peer node 102.1 to one or more protocol processing devices, such as, for example, a PTP protocol processing device for subsequent processing, including the generation of a response packet. In operation, the timestamp T2 can be read from the header of the DELAY_REQ packet 116 and utilized in the generation of the response packet.

In an exemplary embodiment, peer node 102.1 can be configured to adjust timestamps T1 and/or T2 based upon the correction value that represents the residence times encountered by the DELAY_REQ packet 116 enroute from the peer node 102.2 to the peer node 102.1. In this example, the relationship between timestamps T1 and/or T2 is such that:

$$T2=T1+t_o+t_{pd}$$

where $t_o$ is the time offset between the second clock of peer node 102.2 and the first clock of peer node 102.1 and $t_{pd}$ is the propagation delay experienced by the DELAY_REQ packet 116 enroute from the peer node 102.1 to the peer node 102.2.

In synchronizing peer node 102.1 and peer node 102.2, the offset is reduced and/or eliminated. That is, the offset $t_o$ is determined and compensated for by the peer nodes 102 so that the clocks of the peer nodes 102 are synchronized. To determine the offset $t_o$, the peer node 102.2 determines the propagation delay $t_{pd}$. In an exemplary embodiment, the propagation delay $t_{pd}$ is determined by exchanging a delay request packet (e.g., DELAY_REQ packet 116) and a delay response packet (e.g., DELAY_RSP packet 120) between the peer nodes 102. The propagation delay $t_{pd}$ can be determined in in the exemplary embodiment illustrated in FIG. 1B by exchanging a delay request packet (e.g., DELAY_REQ packet 116), a delay response packet (e.g., DELAY_RSP packet 120), and a follow-up response packet (e.g., DELAY_RSP_FOLLOW_UP packet 122) between the peer nodes 102.

In an exemplary embodiment, peer node 102.2 can be configured to generate and transmit a delay request (DELAY_REQ) packet 116 to the peer node 102.1. In operation, the peer node 102.2 is configured to generate a timestamp T1 upon the egress of the DELAY_REQ packet 116 from the peer node 102.2 to the peer node 102.1. The timestamp T1 represents the egress start of packet time of the DELAY_REQ packet 116. It should be appreciated that the DELAY_REQ packet 116 may reach peer node 102.1 directly, or via one or more intermediate nodes. The DELAY_REQ packet 116 may include a correction value that represents a delay (e.g., a queuing delay) experienced by the DELAY_REQ packet 116 at one or more intermediate nodes. Upon ingress of the DELAY_REQ packet 116, the peer node 102.1 can be configured to generate a timestamp T2. The timestamp T2 represents the time at which DELAY_REQ packet 116 has been received by the peer node 102.1. In an exemplary embodiment, the peer node 102.1 can be configured to insert the generated timestamp T2 into the received DELAY_REQ packet 116, and retrieve the stored timestamp T2 for subsequent processing and generation of a response packet by the peer node 102.1. That is, the timestamp T2 can be stored in, and later retrieved from, the DELAY_REQ packet 116 during the generation of, for example, a delay response packet as discussed in more detail below. In an exemplary embodiment, the timestamp T2 can be stored in a header of the DELAY_REQ packet 116. For example, the timestamp T2 can stored in a reserved field of the header of the DELAY_REQ packet 116. In this example, the DELAY_REQ packet 116, which includes timestamps T1 and/or T2, can be forwarded up the protocol stack of peer node 102.1 to one or more protocol processing devices, such as, for example, a PTP protocol processing device for subsequent processing, including the generation of a delay response packet. In operation, the timestamp T2 can be read from the header (and/or the timestamp T1 read from the body) of the DELAY_REQ packet 116 and utilized in the generation of the delay response packet (e.g., utilized in the generation of the DELAY_RSP packet 120 as discussed in more detail below).

In an exemplary embodiment, the peer node 102.1 can be configured to generate and transmit a delay response packet "DELAY_RSP packet" 120 to the peer node 120.2. The DELAY_RSP packet 120 can be generated in response to the receipt of the of DELAY_REQ packet 116. In operation, the peer node 102.1 can be configured to generate a timestamp T3 upon the egress of the DELAY_RSP packet 120 from the peer node 102.1 to the peer node 102.2. The timestamp T3 represents the egress start of packet time of the DELAY_RSP packet 120. The DELAY_RSP packet 120 can include the timestamp T3 and/or timestamp T2. In an exemplary embodiment, the DELAY_RSP packet 120 includes a turnaround time (e.g., the difference between timestamp T3 and timestamp T2 (i.e., T3-T2)) and/or the correction value as recorded in the DELAY_REQ packet 116. That is, in the former, the timestamp T2 is not updated by the peer node 102.1 based upon the correction value. In the latter, the timestamp T2 is updated by the peer node 102.1 based on the correction value, and the updated timestamp T2 and/or timestamp T3 are included in the DELAY_RSP packet 120. In an exemplary embodiment, the timestamp T2 and/or the timestamp T3 (and/or the turnaround time) can be included in the header of the DELAY_RSP packet 120. For example, timestamp T2, timestamp T3, and/or the turnaround time can be included in a correction field of the header of the DELAY_RSP packet 120. In operation, the DELAY_RSP packet 120 may reach peer node 102.2 directly, or via one or more intermediate nodes.

In exemplary embodiments where the DELAY_RSP packet 120 includes the timestamp T1, the timestamp T2 and/or the turnaround time, the peer node 102.1 can be configured to retrieve the previously stored timestamp T1, the timestamp T2, and/or the turnaround time from the DELAY_REQ packet 116. For example, the peer node 102.1 can be configured to retrieve the timestamp T2 from the header (and/or timestamp T1 from the body) of the DELAY_REQ packet 116. In an exemplary embodiment, the peer node 102.1 can be configured to retrieve the timestamp T2 from a reserved field of the header of the DELAY_REQ packet 116.

In operation, the DELAY_REQ packet 116, which includes timestamps T1 and/or T2, and/or the turnaround time, can be forwarded up the protocol stack of peer node 102.1 to one or more protocol processing devices, such as, for example, a PTP protocol processing device for subsequent processing, including the generation of a response packet. In this example, the timestamp T2 can be read from the header of the DELAY_REQ packet 116 and utilized in the generation of the delay response packet (e.g., DELAY_RSP packet 120).

Upon the ingress of the DELAY_RSP packet 120, the peer node 102.2 can be configured to generate a timestamp T4. The timestamp T4 represents the time at which the DELAY_RSP packet 120 has been received by the peer node 102.2. Upon receiving the DELAY_RSP packet 120, the peer node 102.2 has received timestamps T2 and T3, and has previously generated timestamps T1 and T4. Based upon these timestamps, the peer node 102.2 can be configured to synchronize the second clock (CLOCK2) of the peer node 102.2 with the first clock (CLOCK1) of the peer node 102.1. For example, the peer node 102.2 can be configured to determine the difference between the first and second clocks based on the following equation:

$$CLOCK2 - CLOCK1 = \frac{(T2 - T1) + (T4 - T3)}{2}$$

In an exemplary embodiment, the peer node 102.2 can be configured to adjust one or more of the timestamps T1, T2, T3, and/or T4 based on corresponding correction values representing residence time(s) through one or more intermediate nodes prior to synchronization of the node clocks.

Figure 1B:
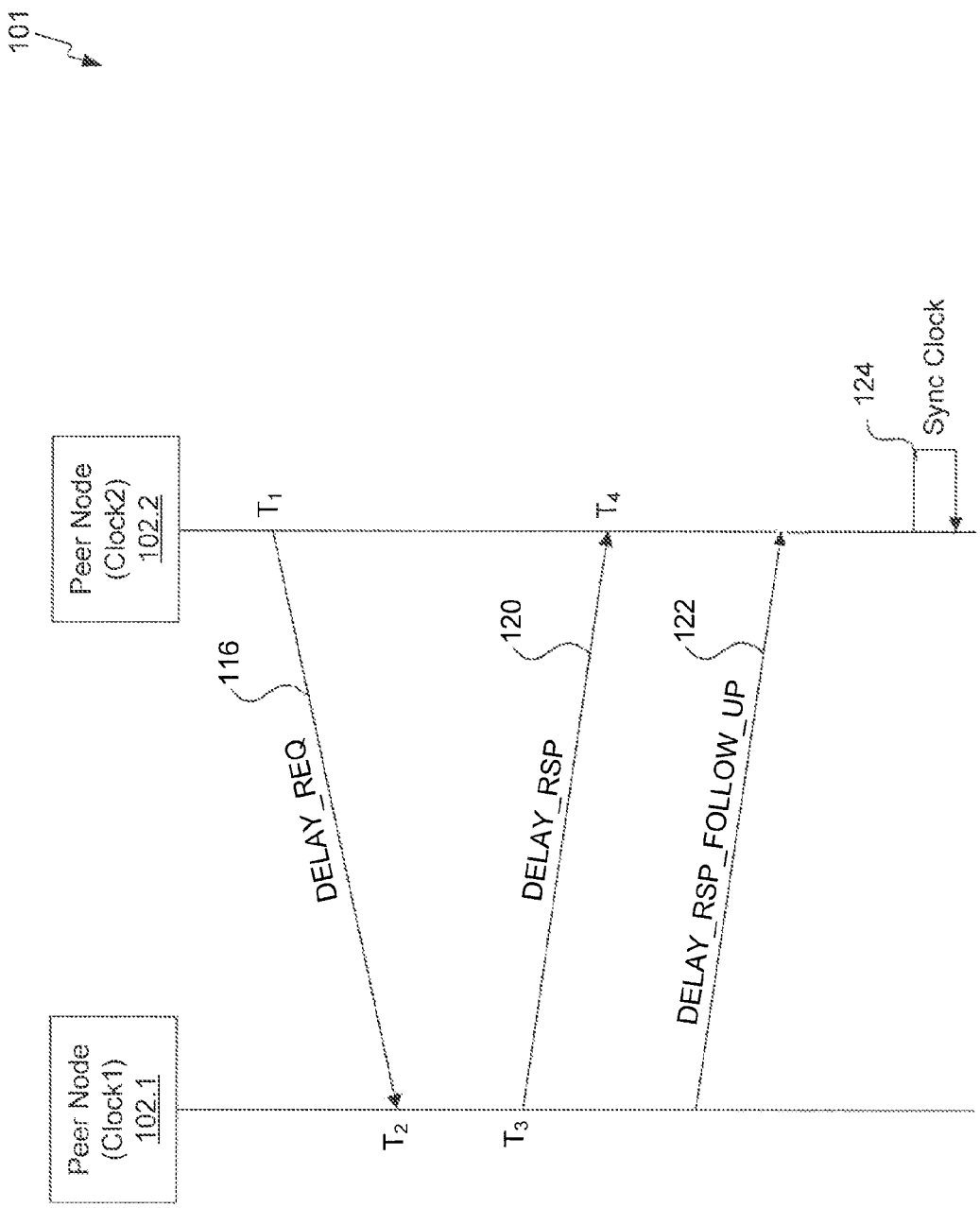
FIG. 1B illustrates an example message sequence for timing synchronization according to an exemplary embodiment of the present disclosure.

FIG. 1B illustrates a sequence diagram 101 of a message exchange for timing synchronization according to an exemplary embodiment of the present disclosure. The sequence diagram 101 is similar to the sequence diagram 100 of FIG. 1A, and includes similar exchanges between the peer nodes 102. Further discussion of one or more of the similar exchanges and/or one or more functional operations of the peer nodes 102 may be omitted for brevity.

In operation, the message exchange begins with the second peer node 102.2 generating and transmitting a delay request a DELAY_REQ packet 116 to the first peer node 102.1. The peer node 102.2 can be configured to generate a timestamp T1 which represents an egress time of the DELAY_REQ packet 116 (e.g., the time that the DELAY_REQ packet 116 was transmitted by the second peer node 102.2 onto the network). The peer node 102.2 can be configured to insert the timestamp T1 (e.g., the egress start of packet time) into the DELAY_REQ packet 116. In an exemplary embodiment, the timestamp T1 can be included in, for example, the payload of the DELAY_REQ packet 116.

When the DELAY_REQ packet 116 reaches the first peer node 102.1, the first peer node 102.1 can be configured to generate a timestamp T2 upon ingress of the DELAY_REQ packet 116. The timestamp T2 represents the ingress start of packet time for the DELAY_REQ packet 116 at the first peer node 102.1. In an exemplary embodiment, the timestamp T1 and/or the timestamp T2 are inserted into the DELAY_REQ packet 116 (e.g., in a header of the DELAY_REQ packet 116). The DELAY_REQ packet 116, which can include timestamps T1 and/or T2, can be forwarded up the protocol stack of peer node 102.1 to one or more protocol processing devices, such as, for example, a PTP protocol processing device for subsequent processing, including the generation of a delay response packet and/or a delay response follow-up packet. In operation, the timestamps T1 and/or T2 can be read from the header of the DELAY_REQ packet 116 and utilized in the generation of a delay response packet and/or a delay response follow-up packet.

In an exemplary embodiment, the peer node 102.1 can be configured to generate and transmit a DELAY_RSP packet 120 to the peer node 120.2. The DELAY_RSP packet 120 can be generated in response to the receipt of the of DELAY_REQ packet 116. In operation, the peer node 102.1 can be configured to generate a timestamp T3 upon the egress of the DELAY_RSP packet 120 from the peer node 102.1 to the peer node 102.2. The timestamp T3 represents the egress start of packet time of the DELAY_RSP packet 120. In an exemplary embodiment, the peer node 102.1 can be configured to retrieve one or more of the timestamp T1, the timestamp T2 and/or the turnaround time included in the DELAY_REQ packet 116 for the generating of the DELAY_RSP packet 120. For example, the peer node 102.1 can be configured to retrieve the timestamp T2 previously stored in the header of the DELAY_REQ packet 116 (and/or timestamp T1 from the body of the DELAY_REQ packet 116 inserted by peer node 102.2). In an exemplary embodiment, the peer node 102.1 can be configured to retrieve the timestamp T2 from a reserved field of the header of the DELAY_REQ packet 116 for use in the generation of the DELAY_RSP packet 120.

In operation, the DELAY_REQ packet 116, which includes timestamps T1 and/or T2, and/or the turnaround time, can be forwarded up the protocol stack of peer node 102.1 to one or more protocol processing devices, such as, for example, a PTP protocol processing device for subsequent processing, including the generation of a delay response follow-up packet. In operation, the timestamp T2 can be read from the header of the DELAY_REQ packet 116 and utilized in the generation of the DELAY_RSP packet 120.

Upon the ingress of the DELAY_RSP packet 120, the peer node 102.2 can be configured to generate a timestamp T4. The timestamp T4 represents the time at which the DELAY_RSP packet 120 has been received by the peer node 102.2.

In an exemplary embodiment, the peer node 102.1 can be configured to generate and transmit a delay response follow-up ("DELAY_RSP_FOLLOW_UP") packet 122 to the peer node 102.2. In this example, the DELAY_RSP_FOLLOW_UP packet 122 is generated and transmitted by the peer node 102.1 after the transmission of the DELAY_RSP packet 120. The DELAY_RSP_FOLLOW_UP packet 122 can include timestamp T3 and/or timestamp T2. In this example, timestamp T3 represents the egress start of packet time of the DELAY_RSP packet 120. Here, the timestamp T3 can be a more accurate representation of the egress start of packet time of the DELAY_RSP packet 120 as the timestamp T3 is generated upon the actual transmission of the DELAY_RSP packet 120 and not at a time before, and substantially close to, the transmission of the DELAY_RSP packet 120. That is, in exemplary embodiments that include the timestamp T3 within the DELAY_RSP packet 120, the timestamp T3 is generated at a time substantially close to (but before) the transmission (or before transmission completion) of the DELAY_RSP packet 120 to allow time for the peer node 102.1 to insert the timestamp T3 into the DELAY_RSP packet 120 before transmission (or before transmission completion) of the DELAY_RSP packet 120. Conversely, by including the timestamp T3 in the DELAY_RSP_FOLLOW_UP packet 122, the timing for the generation of the timestamp T3 can omit (or include a reduced amount of) the lead time for the insertion of the timestamp T3 within the packet.

In an exemplary embodiment, the DELAY_RSP packet 120 can include the timestamp T2 and the DELAY_RSP_FOLLOW_UP packet 122 can include timestamp T3. In an alternative exemplary embodiment, the DELAY_RSP_FOLLOW_UP packet 122 can include timestamp T2 and timestamp T3. In this example, the DELAY_RSP packet 120 can also include timestamp T2, or the timestamp T2 may be omitted from the DELAY_RSP packet 120.

In an exemplary embodiment, the DELAY_RSP_FOLLOW_UP packet 122 can include timestamp T2 and timestamp T3, and/or a turnaround time (e.g., the difference between timestamp T3 and timestamp T2 (i.e., T3-T2)). One or more of the timestamp T2, the timestamp T3, and/or the turnaround time can be included in, for example, the header of the DELAY_RSP_FOLLOW_UP packet 122.

Upon receiving the DELAY_RSP_FOLLOW_UP packet 122, the peer node 102.2 has received timestamps T2 and T3, and has the previously generated timestamps T1 and T4. Based upon these timestamps, the peer node 102.2 can be configured to synchronize (e.g., sync clock 124) the second clock (CLOCK2) of the peer node 102.2 with the first clock (CLOCK1) of the peer node 102.1. For example, the peer node 102.2 can be configured to determine the difference between the first and second clocks based on the following equation:

$$CLOCK2 - CLOCK1 = \frac{(T2 - T1) + (T4 - T3)}{2}$$

Figure 2:
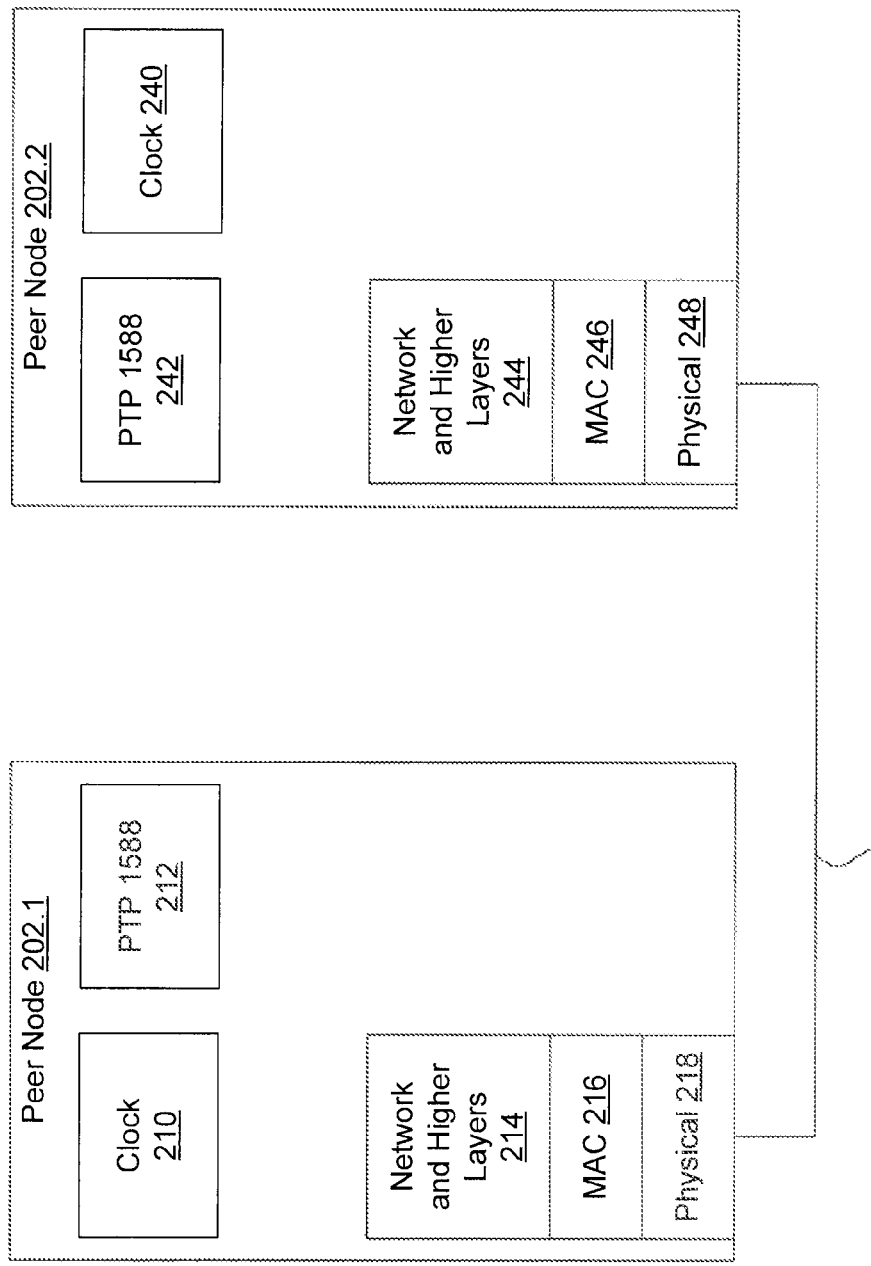
FIG. 2 illustrates a system for synchronizing time between network entities according to an exemplary embodiment of the present disclosure.

FIG. 2 illustrates a system 200 for synchronizing time between network entities according to an exemplary embodiment of the present disclosure. The system 200 includes peer node 202.1 communicatively coupled to peer node 202.2 via network 208. In an exemplary embodiment, peer nodes 202.1 and 202.2 can be one embodiment of peer nodes 102.1 and 102.2, respectively, as illustrated in FIGS. 1A and 1B.

In exemplary embodiments, peer node 202.1 is configured to synchronize clock 210 of peer node 202.1 with clock 240 of peer node 202.2 and/or peer node 202.2 is configured to synchronize clock 240 of peer node 202.2 with clock 210 of peer node 202.1. Clock 210 and/or clock 240 may be based upon a Global Navigation Satellite Systems (GNSS) clock, a master clock, a grand master clock, and/or one or more accurate network clocks as would be understood by those skilled in the relevant art(s). Peer node 202.1 and/or peer node 202.2 may include, for example, a GNSS receiver (not shown) and GNSS clock adjust circuitry (not shown), which may be used by peer node 202.1 and/or peer node 202.2 to keep their respective clocks 210 and/or 240 in synchronization with an accurate external GNSS clock. Clock 210 and clock 240 can each include circuitry, logic and/or code that are configured to generate one or more clocks having corresponding clock frequencies. For example, clocks 210 and/or 240 can include electronic oscillator circuitry, such as, for example, crystal oscillator circuitry, and/or a phase lock loop (PLL).

Network 208 can include one or more well-known wired and/or wireless communication mediums and/or one or more well-known communication components—such as one or more network switches, network routers, network gateways, wireless access points, network modems, servers, databases, and/or computers to provide some examples.

Peer node 202.1 can include a network protocol stack including a physical (PHY) layer 218, a media access control (MAC) layer 216, and a network layer 214. The peer node 202.1 can also include one or more higher layers, such as a transport layer, a session layer, a presentation layer, an application layer, and/or one or more other layers defined in, for example, the Open Systems Interconnection (OSI) model.

The network layer 214 can include one or more processors, circuitry, logic and/or code that are configured to process internet protocol (IP) communications—such as routing, switching, and/or forwarding communications—and/or one or more other Layer 3 operations as defined in the OSI model.

The MAC layer 216 can include one or more processors, circuitry, logic and/or code that are configured to process packet headers, perform one or more addressing operations, perform one or more channel access control operations, and/or one or more other Layer 2 operations as defined in the OSI model.

The physical (PHY) layer 218 can include one or more processors, circuitry, logic and/or code that are configured to process one or more packets, perform transmission and/or reception of one or more packets, interface with one or more communication mediums, and/or to perform one or more other Layer 1 operations as defined in the OSI model. In an exemplary embodiment, the processing of packets by the PHY layer 218 can include the generation of one or more timestamps by the PHY layer 218. The timestamp generation can be in response to one or more events, such as, for example, the receipt/transmission of a PTP message and/or the receipt/transmission of one or more data packets.

Peer node 202.1 can also include a Precision Time Protocol (PTP) device 212, which can include one or more processors, circuitry, logic and/or code that are configured to generate and/or process one or more messages, perform timestamping of ingress and/or egress packets, classifying one or more packets, and/or perform one or more synchronization operations to maintain synchronization of clock 210 with one or more other clocks, such as clock 240. In an exemplary embodiment, the PTP device 212 can be configured to determine a residence time of packets and/or update one or more timestamps of one or more ingress and/or egress packets. In an exemplary embodiment, the PTP device 212 can be configured to process one or more packets to conform to the Precision Time Protocol (PTP) as defined in the IEEE 1588 protocol. For example, the PTP device 212 can be configured to, for example, generate and/or process one or more messages, classify one or more packets, and/or perform timestamping of ingress and/or egress packets, to conform to the Precision Time Protocol (PTP).

In operation, one or more of the clock 210, the Precision Time Protocol (PTP) device 212, the network layer 214, the media access control (MAC) layer 216, and the physical (PHY) layer 218 of the peer node 202.1 can be configured to operate in combination with one or more of the other components to synchronize and/or maintain synchronization of clock 210 with one or more other clocks as illustrated in FIGS. 1A and 1B.

Peer node 202.2 can include a clock 240, a Precision Time Protocol (PTP) device 242, a network layer 244, a media access control (MAC) layer 246, and a physical (PHY) layer 248. These components are similar to, and can be configured to perform similar functions as, the clock 210, the Precision Time Protocol (PTP) device 212, the network layer 214, the media access control (MAC) layer 216, and the physical (PHY) layer 218 of the peer node 202.1, respectively.

Figures 3A, 3B:
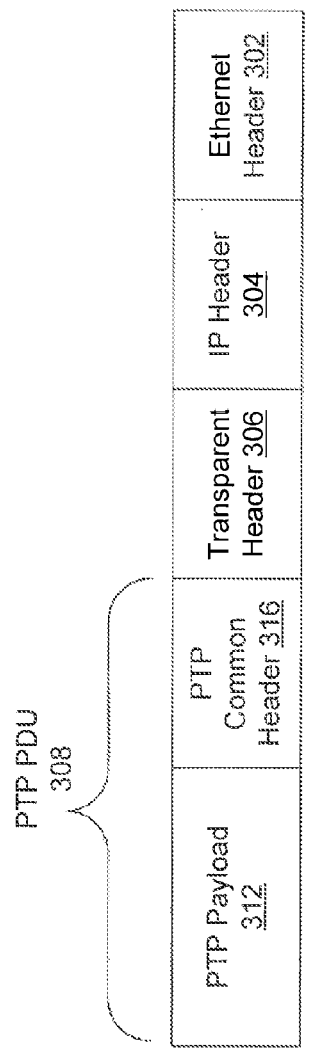
FIG. 3A illustrates an example format of a Precision Time Protocol (PTP) packet according to an exemplary embodiment of the present disclosure.
FIG. 3B illustrates an example format of a common header of a PTP packet according to an exemplary embodiment of the present disclosure.

FIG. 3A illustrates a format for a packet 300 according to an exemplary embodiment. In an exemplary embodiment, the packet 300 conforms to the Precision Time Protocol (PTP) as described in the IEEE 1588 protocol and is generated and/or processed by peer nodes 202.1 and/or 202.2.

Packet 300 illustrates a sequence of headers of the different protocol layers that are attached to the PTP payload 312. In an exemplary embodiment, the Precision Time Protocol (PTP) is located above the transport layer (e.g., user datagram protocol (UDP)) of the Open Systems Interconnect (OSI) protocol stack. The PTP payload 312 can include a message format for one or more of the PTP message types such as, but not limited to, DELAY_REQ, DELAY_RSP, and/or DELAY_RSP_FOLLOW_UP as described with reference to FIGS. 1A and 1B.

In operation, the PTP payload 312 can be preceded by a PTP common header 316. The format of the PTP common header 316 is described with reference to FIG. 3B. The PTP payload 312 and common header 316 form a PTP protocol data unit (PDU) 308. The PTP device 212 and/or the PTP device 242 can be configured to process the PTP PDU 308 to synchronize (and/or maintain synchronization of) the clocks 210 and/or 240.

The PTP PDU 308 is preceded by a transport protocol header 306 that includes port level information for protocol processing of packets. In an exemplary embodiment, the transport protocol header 306 may include a user datagram protocol (UDP) header conforming to the IEEE 1588 protocol.

The transport protocol header 306 is preceded by a network protocol header 304 and a MAC layer header 302. In an exemplary embodiment, the network protocol header 304 and the MAC layer header 302 are, for example, an IP header and an Ethernet header, respectively.

FIG. 3B illustrates a format of the common header 316 of the packet 300 according to an exemplary embodiment of the present disclosure. In an exemplary embodiment, the common header 316 can be attached to, for example, a PTP message in accordance with PTP and/or the IEEE 1588 protocol.

In an exemplary embodiment, the common header 316 includes header fields: messageType 328 indicative of the type of PTP message, a controlField 330 indicative of one or more PTP operations, domainNumber 332 configured to identify one or more synchronization domains, sourcePortIdentity 334 configured to identify one or more source ports, sequenceIdentifier 336 configured to identify one or more cycles of synchronization message exchanges, a correctionField 340 configured to identify one or more residence times of packet transmissions through one or more intermediate nodes, and/or one or more egress and/or ingress timestamps.

In an exemplary embodiment, the common header 316 can also include three reserved fields: reserved(0) field 322, reserved(1) field 324 and reserved(2) field 326. The PTP and the IEEE 1588 protocol do not define these reserved fields or the utilization thereof. In an exemplary embodiment, the reserved(0) field 322 is, for example, 4 bits, the reserved(1) field 324 is, for example, 8 bits, and the reserved(2) field 326 is, for example, 32 bits.

In exemplary embodiments, the peer nodes 102.1 and/or 102.2 illustrated in FIGS. 1A and 1B, and/or the peer nodes 202.1 and/or 202.2 illustrated in FIG. 2 can be configured to utilize one or more of the reserved fields of the common header 316 to synchronize (and/or maintain synchronization of) their respective peer node clocks (e.g., clocks 210 and/or 240).

In operation, the reserved(0) field 322 can be configured to enable inband synchronization processing utilizing reserved(1) field 324 and/or reserved(2) field 326. In operation, when the reserved(0) field 322 is asserted, the peer nodes 102/202 can be configured to utilize reserved(1) field 324 and/or reserved(2) field 326 for inband synchronization processing. For example, when the reserved(0) field 322 is asserted (e.g., the reserved(0) field 322 contains a value that matches a predetermined value indicative that the inband synchronization processing has been enabled), the peer nodes 102/202 can be configured to read values from, and/or write values to, reserved(1) field 324 and/or reserved(2) field 326. When the reserved(0) field 322 is not asserted, the peer nodes 102/202 can be configured to ignore values stored in the reserved(1) field 324 and/or reserved(2) field 326 and to omit reading/writing to these fields.

In an exemplary embodiment, the reserved(1) field 324 can be configured to identify one or more status and/or commands for inband synchronization processing. Example commands/statuses and their corresponding bit/offset configurations are shown below in Table 1. Exemplary implementations of one or more of these commands and/or statuses are discussed in more detail below.

TABLE 1

| Command/Status | Bit | Offset |
| --- | --- | --- |
| SOPMem_CAP: Capture egress start-of-packet (SOP) timestamp, Source IP (S_IP), Sequence ID and/or DomainNumber into memory. | 1 | 1 |
| ITS_UPDATED: Indicates that a valid ingress times stamp (ITS) has been updated in reserved(2) field or that an ITS is to be updated. For ingress, this functions as a status field, while functions as a command field for egress. | 1 | 2 |
| SOPMem_UPDATED: Read and/or update a start of packet (SOP) timestamp in reserved(2) field. | 1 | 3 |

The SOPMem_CAP ("start of packet memory capture") command indicates that one or more parameters and/or packet attributes are to be captured. For example, when the reserved(1) field 324 includes a bit/offset configured corresponding to the SOPMem_CAP command, a timestamp (e.g., timestamp T3) that corresponds to the egress of a packet DELAY_RSP packet 120 from peer node 102/202 can be generated and stored in a memory of a peer node 102/202. The peer node 102/202 can also be configured to store the source/destination IP address of the egress packet, a sequence ID corresponding to the egress packet, and/or a domain number associated with the egress packet. The peer node 102/202 can be configured to utilize one or more of the stored parameters and/or packet attributes for inband synchronization processing.

The ITS_UPDATED ("ingress timestamp updated") command/status indicates that whether the ingress timestamp (ITS) has been updated in reserved(2) field 326 or that the ITS is to be updated. In operation, the ITS_UPDATED value functions as a status field for ingress packets and as a command field for egress packets.

SOPMem_UPDATED ("start of packet memory updated") command indicates that one or more parameters and/or packet attributes have been previously captured. For example, when the reserved(1) field 324 includes a bit/offset configuration corresponding to the SOPMem_UPDATED command, a timestamp (e.g., timestamp T3) that corresponds to the egress of a packet DELAY_RSP packet 120 from peer node 102/202 has been previously stored in memory of the peer node 102/202. The SOPMem_UPDATED command can also indicate that the source/destination IP address of the egress packet, the sequence ID corresponding to the egress packet, and/or the domain number associated with the egress packet has been previously stored. The peer node 102/202 can be configured to retrieve one or more of the stored parameters and/or packet attributes for inband synchronization processing as discussed in more detail below.

Figure 4:
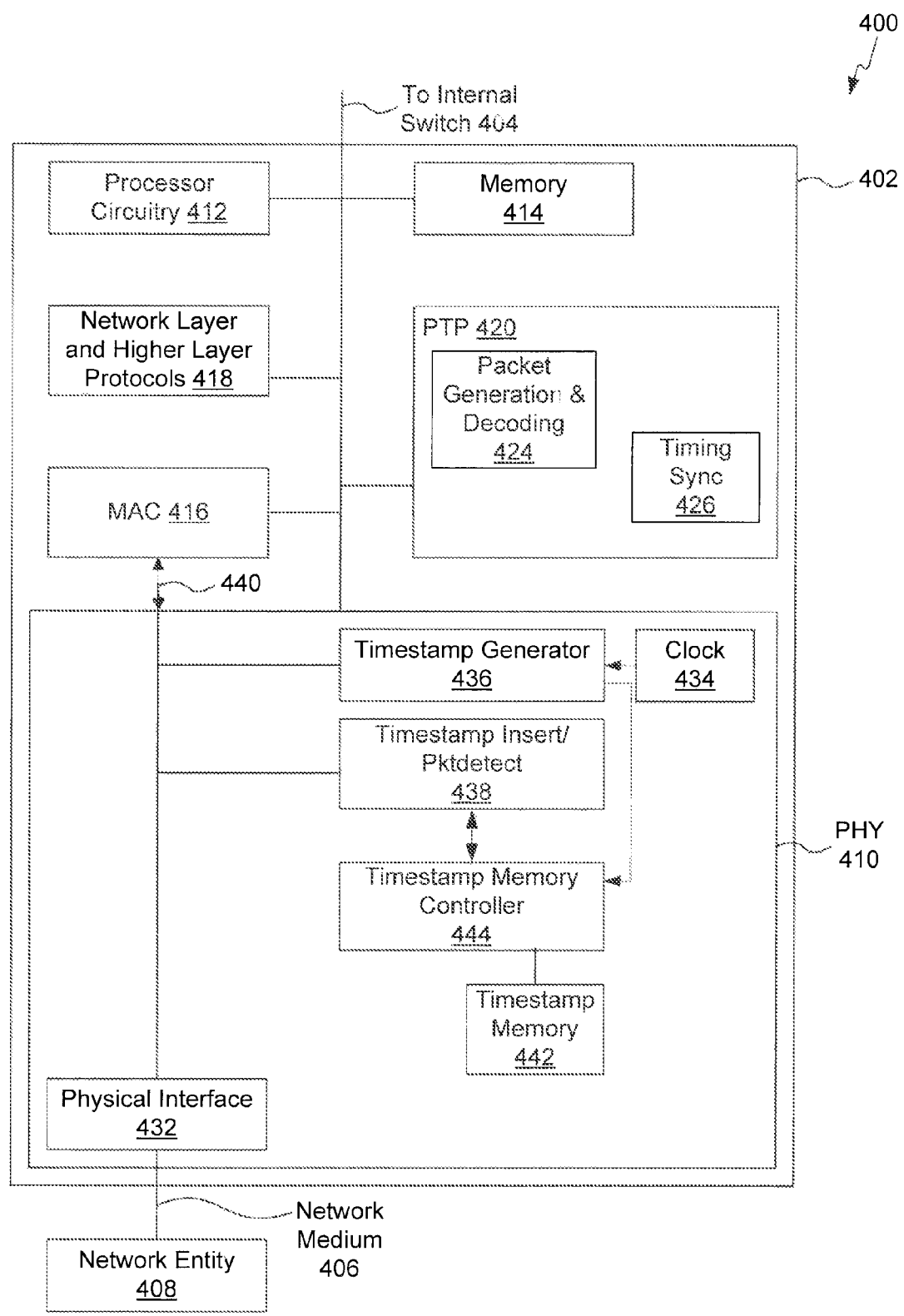
FIG. 4 illustrates a system for time synchronization of network entities according to an exemplary embodiment of the present disclosure.

FIG. 4 illustrates a system 400 for time synchronization of network entities according to an exemplary embodiment of the present disclosure. System 400 illustrates a line card 402 that can be implemented in one or more peer nodes 102 of FIGS. 1A and 1B, and/or in one or more peer nodes 202 of FIG. 2.

Line card 402 is coupled to an internal switch (not shown) via at least one communications bus 404. The internal switch and bus 404 communicatively couples line card 402 to one or more other line cards and/or processing devices of a peer node 102/202.

Line card 402 can include one or more processors, circuitry, logic and/or code that are configured to communicatively couple the line card 402 to one or more other line cards of one or more other corresponding peer nodes 102/202. For example, the line card can be configured to be communicatively coupled to one or more other peer nodes 102/202 via a network medium 406.

In an exemplary embodiment, the line card 402 includes a network physical layer (PHY) 410, processor circuitry 412, a memory 414, a media access controller (MAC) 416, a network layer protocol device 418, and a Precision Time Protocol (PTP) device 420. Two or more of these components can be communicatively coupled to each other via a communication infrastructure, such as, for example, a bus.

The processor circuitry 412 can include one or more: circuit(s), processor(s), or a combination thereof. The process circuitry 412 can be configured to control the overall operation of the line card 402, including the operation of one or more of the PHY 410, MAC protocol device 416, network layer protocol device 418, and/or Precision Time Protocol (PTP) device 420. In an exemplary embodiment, the PHY 410, MAC 416, the network layer protocol device 418, and/or PTP device 420 can be implemented by the processor circuitry 412 and the processor circuitry 412 can be configured to perform one or more corresponding functions of one or more of these components as discussed below.

For the purpose of this disclosure, a circuit can include an analog circuit, a digital circuit, state machine logic, other structural electronic hardware, or a combination thereof. A processor can include a microprocessor, a digital signal processor (DSP), field programmable gate array (FPGA), an application specific integrated circuit (ASIC), and/or one or more other well-known hardware processors. The processor can be "hard-coded" with instructions to perform corresponding function(s) according to embodiments described herein. Alternatively, the processor can access an internal and/or external memory (e.g., memory 414) to retrieve instructions stored in the memory, which when executed by the processor, perform the corresponding function(s) according to embodiments described herein.

Memory 414 can be any well-known volatile and/or non-volatile memory, and can be non-removable, removable, or a combination of both. For example, memory 414 may include dynamic random access memory (DRAM), static random access memory (SRAM), flash memory, or any other well-known type of memory. Memory 414 can store data and/or instructions, where when the instructions are executed by the processor circuitry 412, the processor circuitry 412 performs the functions described herein MAC protocol device 416 can include one or more processors, circuitry, logic and/or code that are configured to provide media access control processing for the transmission and/or reception of one or more packets via the network medium 406.

Network layer protocol device 418 can include one or more processors, circuitry, logic and/or code that are configured to process internet protocol (IP) communications—such as routing, switching, and/or forwarding communications—and/or one or more Layer 3 operations as defined in the OSI model.

The Precision Time Protocol (PTP) device 420 can include one or more processors, circuitry, logic and/or code that are configured to generate and/or process one or more messages, perform timestamping of ingress and/or egress packets, classifying one or more packets, and/or perform one or more synchronization operations to maintain synchronization of an internal clock with one or more external clocks. In an exemplary embodiment, the PTP device 420 can be implemented as, for example, PTP devices 212 and/or 242 as illustrated in FIG. 2.

In an exemplary embodiment, the PTP device 420 can be configured to determine a residence time of one or more packets and/or update one or more timestamps of one or more ingress and/or egress packets. In an exemplary embodiment, the PTP device 420 can be configured to process packets to conform to the Precision Time Protocol (PTP) as defined in IEEE 1588. For example, the PTP device 420 can be configured to, for example, generate and/or process one or more messages, perform timestamping of ingress and/or egress packets, and/or classifying one or more packets to conform to the Precision Time Protocol (PTP).

In an exemplary embodiment, the PTP device 420 includes packet generation and decoding device 424 and a timing synchronization device 426. The packet generation and decoding device 424 can include one or more processors, circuitry, logic and/or code that are configured to generate packets conforming to the Precision Time Protocol (PTP) as defined in IEEE 1588—such as, for example, DELAY_REQ, DELAY_RSP, and/or DELAY_RSP_FOLLOW_UP packets—and/or to decode one or more received packets. Timing synchronization device 426 can include one or more processors, circuitry, logic and/or code that are configured to determine and/or initiate a clock adjustment based upon one or more timestamps.

In an exemplary embodiment, the PHY 410 can include a physical interface 432, a clock 434, a timestamp generator 436, a timestamp insert and packet detection device 438, a timestamp memory 442, and a timestamp memory controller 444 configured to control access to the timestamp memory 442.

Physical interface 432 can include one or more processors, circuitry, logic and/or code that are configured to interface with one or more wired and/or wireless communication mediums (e.g., network medium 406) to facilitate the transmission and/or reception of one or more packets. In an exemplary embodiment, the physical interface 432 is configured to provide, for example, one or more Ethernet interfaces, one or more optical interfaces, and/or other electrical signaling interfaces to send and receive data including one or more transmitters and/or receivers. In an exemplary embodiment, the physical interface 432 is located at or substantially proximate to the interface with the network medium 406.

Clock 434 can include circuitry, logic and/or code that are configured to generate one or more clocks having corresponding clock frequencies. For example, clock 434 can include electronic oscillator circuitry, such as, for example, crystal oscillator circuitry configured to generate the one or more clocks. Clock 434 can be configured to generate a local clock that provides a timing signal for operations performed by the PHY 410. Clock 434 may be based upon a physical and/or logical clock. In an exemplary embodiment, the clock 434 is derived from an oscillator local to PHY 410 or network entity (e.g., peer node 102/202) that includes PHY 410. According to another exemplary embodiment, clock 434 is based upon a logical clock recovered from a data stream received by the PHY 410.

Timestamp generator 436 can include one or more processors, circuitry, logic and/or code that are configured to generate one or more timestamps. In an exemplary embodiment, the timestamps can conform to the PTP as defined by IEEE 1588. In an exemplary operation, the timestamp generator 436 can be configured to generate one or more timestamps in response to one or more events, such as, for example, the receipt/transmission of a PTP message and/or the receipt/transmission of one or more data packets (e.g., DELAY_REQ packet 116, DELAY_RSP packet 120, and/or DELAY_RSP_FOLLOW_UP packet 122).

In an exemplary embodiment, the timestamp generator 436 can be configured to capture the current time from clock 434, and, based upon the type of message/packet for which the timestamp is generated, store the timestamp in a memory, or insert (e.g., write) the timestamp in the packet that has been received or is to be transmitted.

In an exemplary embodiment, the timestamp generator 436 can be configured to generate one or more timestamps based on one or more commands included within one or more egress and/or ingress packets. For example, the timestamp generator 436 can be configured to generate a timestamp during the egress of a packet based on one or more timestamp generation commands included in the egress packet. In an exemplary embodiment, the one or more commands can be included in a reserved field of the header of the packet.

Timestamp insert and packet detection device 438 can include one or more processors, circuitry, logic and/or code that are configured to detect one or more types of incoming and/or outgoing message, to detect one or more commands (e.g., timestamp retrieval command(s) and/or one or more other commands as shown in Table 1), retrieve one or more timestamps from timestamp memory 442, and/or to insert one or more timestamps in one or more ingress and/or egress packets. For example, the timestamp insert and packet detection device 438 can be configured to obtain one or more timestamps from the timestamp generator 436 and/or to retrieve one or more timestamps from the timestamp memory 442 based on one or more timestamp retrieval commands included in an egress packet. In an exemplary embodiment, the one or more commands can be included in a reserved field of the header of the packet.

Timestamp memory controller 444 can include one or more processors, circuitry, logic and/or code that are configured to control read/write access to timestamp memory 442.

In an exemplary embodiment, timestamp memory controller 444 can be configured to access timestamp entries based upon one or more fields from the common header 320 (e.g., domain number and sequence ID). In operation, timestamp memory 442 is configured to store timestamps captured by timestamp generator 436 for one or more ingress and egress packets. Other information from the packets that can be used to correlate packets of a message exchange (e.g., domain number and/or sequence ID from the common header 320) may also be stored in association with one or more timestamps. In an exemplary embodiment, timestamp memory 442 can be configured as a first-in-first-out (FIFO) buffer.

In an exemplary embodiment, the timestamp memory controller 444 can be configured to process one or more out-of-order accesses to information stored in timestamp memory 442. For example, upon receiving a request to access a timestamp having a later sequence ID than the lowest sequence ID currently stored in timestamp memory 442, memory controller 444 may invalidate all entries that are associated with sequence IDs that are lower than the requested later sequence ID.

In operation, the PHY 410 and MAC 416 can be configured to communicate with each other via a host interface 440. In this example, data (e.g., packets) and/or control information can be communicated over the host interface 440. In an exemplary embodiment, the host interface 440 is a Media Independent Interface (MII) or a Management Data Input/Output (MDIO) interface.

Figure 5:
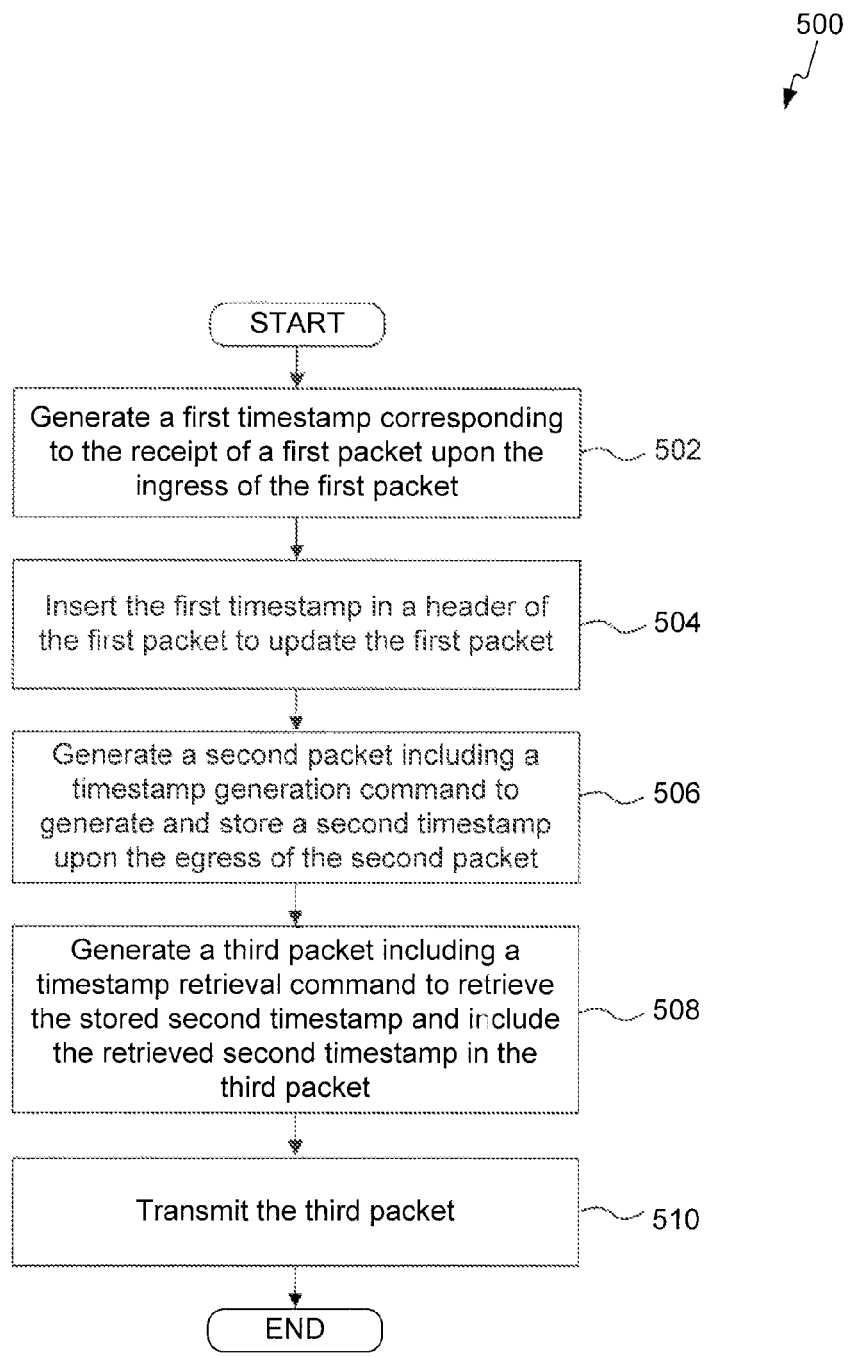
FIG. 5 illustrates a flowchart of a time synchronization method according to an exemplary embodiment of the present disclosure.

FIG. 5 illustrates a flowchart 500 of a synchronization method according to an exemplary embodiment of the present disclosure. In an exemplary embodiment, the synchronization method can be based upon a message exchange between two or more peer nodes 102/202. The method of flowchart 500 is described with continued reference to one or more of FIGS. 1-4. The steps of the method of flowchart 500 are not limited to the order described below, and the various steps may be performed in a different order. Further, two or more steps of flowchart 500 may be performed simultaneously with each other.

In an exemplary embodiment, flowchart 500 of the synchronization method can be performed by a peer node 202 as illustrated in FIG. 2 during, for example, message exchanges 100 and/or 101 illustrated in FIGS. 1A and/or 1B, respectively. Using the synchronization method illustrated in flowchart 500, a peer node 202 may obtain the one or more timestamps (e.g., timestamp T3) inband with exchanged messages rather than accessing a local memory in utilizing a host interface (e.g., MDIO interface).

The method of flowchart 500 begins at step 502, where peer node 202.1 generates a timestamp (e.g., timestamp T2) upon the ingress of a packet received by the peer node 202.1. In this example, the received packet can be sent from, for example, peer node 202.2. In an exemplary embodiment, the received packet is a DELAY_REQ packet 116 conforming to the Precision Time Protocol (PTP) as defined in IEEE 1588. In this example, the DELAY_REQ packet 116 can include an egress timestamp T1 within, for example, the body of the DELAY_REQ packet 116. The timestamp T1 can represent the time at which the DELAY_REQ packet 116 was transmitted to peer node 202.1 by the peer node 202.2.

In an exemplary embodiment, the timestamp T2 is generated by timestamp generator 436 as illustrated in FIG. 4. In operation, the timestamp generator 436 can be configured to generate the timestamp T2 (in cooperation with the clock 434) based upon PHY 410 detecting the reception of the packet. For example, the timestamp generator 436 can be configured to generate the timestamp T2 upon the reception of the DELAY_REQ packet 116.

After step 502, the method of flowchart 500 transitions to step 504, where the peer node 202.1 inserts the generated timestamp T2 into the received packet (e.g., the DELAY_REQ packet 116). The insertion of the timestamp T2 can be referred to as "updating" the received packet. In an exemplary embodiment, the peer node 202.1 is configured to insert the timestamp T2 into a header of the DELAY_REQ packet 116. In an exemplary embodiment, the peer node 202.1 is configured to insert the timestamp T2 into a reserved field of the header of the DELAY_REQ packet 116. For example, the PTP device 420 can be configured to insert the timestamp T2 into reserved(2) field 326 of the common header 316. The inserted timestamp T2 can be used for subsequent processing and the generation of a response packet as discussed below, and/or stored within, for example, timestamp memory 442. By doing so, both the timestamp T2 and the packet can be stored at the same address in the timestamp memory 442.

After step 504, the method of flowchart 500 transitions to step 506, where the peer node 202.1 generates a response packet that is responsive to the received packet. In an exemplary embodiment, the response packet is a DELAY_RSP packet 120 conforming to the Precision Time Protocol (PTP) as defined in IEEE 1588 and is transmitted to peer mode 202.2. In an exemplary embodiment, the PTP device 420 is configured to generate the DELAY_RSP packet 120. In an exemplary embodiment, the PTP device 420 can be configured to retrieve the timestamp T2 previously inserted in reserved(2) field 326 and to include the timestamp T2 in the DELAY_RSP packet 120. In an alternative embodiment, the timestamp T2 is not included in the DELAY_RSP packet 120, and the PTP device 420 is configured to include the timestamp T2 is a follow-up response packet (e.g., DELAY_RSP_FOLLOW_UP packet 122) as discussed below.

In an exemplary embodiment, the peer node 202.1 (e.g., PTP device 420) can be configured to include a command in the DELAY_RSP packet 120 to facilitate the generation of a timestamp corresponding to the egress time of the DELAY_RSP packet 120. For example, the included command can indicate that the PHY 410 is to generate a timestamp upon the egress of the DELAY_RSP packet 120. In an exemplary embodiment, the PTP device 420 can be configured to insert a timestamp generation command in a reserved field of the DELAY_RSP packet 120 to instruct the PHY 410 to generate a timestamp (e.g., timestamp T3) upon the transmission of the DELAY_RSP packet 120 to, for example, peer node 202.2. In an exemplary embodiment, the PHY 410 can be configured to remove the previously inserted timestamp generation command from the reserved field of the DELAY_RSP packet 120 prior to transmission of the DELAY_RSP packet 120 to, for example, peer node 202.2.

For example, the PTP device 420 can be configured to set a value of the reserved(1) field 324 within the common header 316 to indicate that timestamp T3 is to be generated upon the transmission of the DELAY_RSP packet 120. In this example, the PTP device 420 can be configured to set the value of the reserved(1) field 324 to include a bit/offset corresponding to the SOPMem_CAP command as illustrated in Table 1. In operation, the PHY 410 (e.g., timestamp insert and packet detection device 438) can be configured to analyze the DELAY_RSP packet 120 during the egress of the DELAY_RSP packet 120 to identify the status of the reserved(1) field 324. The PHY 410 (e.g., timestamp insert and packet detection device 438) can also be configured to reset the value (e.g., delete the value) of the reserved(1) field 324 before the PHY 410 transmits the DELAY_RSP packet 120.

Upon determining that the reserved(1) field 324 includes a value corresponding to the SOPMem_CAP command, the PHY 410 (e.g., timestamp generator 436) can be configured to generate the timestamp T3 corresponding to the egress time of the DELAY_RSP packet 120 that is transmitted by the PHY 410. In an exemplary embodiment, the generated timestamp T3 can be stored in, for example, timestamp memory 442. In this example, the PHY 410 can also be configured to determine and store a source IP address, a destination IP address, a destination MAC address, a sequence ID, and/or a domain number corresponding to the DELAY_RSP packet 120 and the associated timestamp T3 in, for example, timestamp memory 442. That is, the T3 timestamp can be stored in timestamp memory 442 such that the timestamp T3 is indexed based upon one or more fields of the header of the DELAY_RSP packet 120. For example, the stored entry may include, in addition to the timestamp T3, the domain number and sequence ID from the common header 316 of the DELAY_RSP packet 120 for which the timestamp T3 was determined. In an exemplary embodiment, the generation of the timestamp T3 can include updating one or more checksum (e.g., cyclic redundancy check) values that are (and/or are to be) included in the DELAY_RSP packet 120.

After step 506, the method of flowchart 500 transitions to step 508, where the peer node 202.1 generates a follow-up response packet following the transmission of the response packet (e.g., DELAY_RSP packet 120). In an exemplary embodiment, the follow-up response packet is a DELAY_RSP_FOLLOW_UP packet 122 conforming to the Precision Time Protocol (PTP) as defined in IEEE 1588. In an exemplary embodiment, the PTP device 420 is configured to generate the DELAY_RSP_FOLLOW_UP packet 122 and the PHY 410 is configured to transmit the DELAY_RSP_FOLLOW_UP packet 122 to one or more other peer nodes.

In an exemplary embodiment, the DELAY_RSP_FOLLOW_UP packet 122 can include the timestamp T3 corresponding to the egress time of the DELAY_RSP packet 120. For example, the PHY 410 (e.g., timestamp insert and packet detection device 438) can be configured to retrieve the timestamp T3 from, for example, timestamp memory 442 and insert the timestamp T3 within, for example, the payload of the DELAY_RSP_FOLLOW_UP packet 122. Similarly, in exemplary embodiments where the timestamp T2 has not been include in the DELAY_RSP packet 120, the DELAY_RSP_FOLLOW_UP packet 122 can include the timestamp T2 in addition to the timestamp T3. In this example, the PTP device 420 can be configured to retrieve the timestamp T2 previously inserted in reserved(2) field 326 of the DELAY_REQ packet 116 received and stored in, for example, memory 414 and/or timestamp memory 442, and to include the retrieved timestamp T2 in the DELAY_RSP_FOLLOW_UP packet 122. In an exemplary embodiment, timestamp T3 and/or timestamp T2 can be inserted in a payload of the DELAY_RSP_FOLLOW_UP packet 122.

In an exemplary embodiment, the peer node 202.1 (e.g., PTP device 420) can be configured to include a command in the DELAY_RSP_FOLLOW_UP packet 122 to facilitate the retrieval of the previously generated timestamp T3 corresponding to the egress time of the DELAY_RSP packet 120, and to facilitate the inclusion of the timestamp T3 in the DELAY_RSP_FOLLOW_UP packet 122. For example, the included command can indicate that the PHY 410 is to retrieve the timestamp T3 from, for example, timestamp memory 442. In response to the command, the PHY 410 (e.g., timestamp insert and packet detection device 438) can be configured to search for, and retrieve, the timestamp T3 based on one or more parameters and/or packet attributes—such as, for example, a source IP address, a destination IP address, a destination MAC address, a sequence ID, and/or a domain number corresponding to the DELAY_RSP packet 120 and the associated timestamp T3.

In an exemplary embodiment, the PTP device 420 can be configured to insert a timestamp retrieval command in a reserved field of the DELAY_RSP_FOLLOW_UP packet 122 to instruct the PHY 410 to retrieve the timestamp T3 upon the transmission of the DELAY_RSP_FOLLOW_UP packet 122 to, for example, peer node 202.2. For example, the PTP device 420 can be configured to set a value of the reserved(1) field 324 to indicate that timestamp T3 is to be retrieved and inserted into the DELAY_RSP_FOLLOW_UP packet 122 upon the transmission of the DELAY_RSP_FOLLOW_UP packet 122. In this example, the PTP device 420 can be configured to set the value of the reserved(1) field 324 to include a bit/offset corresponding to the SOPMem_UPDATED command as illustrated in Table 1.

In operation, the PHY 410 can be configured to analyze the DELAY_RSP_FOLLOW_UP packet 122 during the generation and/or egress of the DELAY_RSP_FOLLOW_UP packet 122 to identify the status of the reserved(1) field 324. Upon determining that the reserved(1) field 324 includes a value corresponding to the SOPMem_UPDATED command, the PHY 410 can be configured to retrieve the timestamp T3 from, for example, timestamp memory 442, and insert the timestamp T3 in the DELAY_RSP_FOLLOW_UP packet 122. In an exemplary embodiment, the PHY 410 can be configured to remove the previously inserted timestamp retrieval command from the reserved field of the DELAY_RSP_FOLLOW_UP packet 122 prior to transmission of the DELAY_RSP_FOLLOW_UP packet 122 to, for example, peer node 202.2.

In an exemplary embodiment, the PHY 410 can be configured to update the value of the correction field (CF) 340 within the common header 216 of the DELAY_RSP_FOLLOW_UP packet 122 to include the timestamp T3. For example, in exemplary embodiments where the timestamp T2 was included in the DELAY_RSP packet 120, the PHY 410 can be configured to update the value of correction field 340 to satisfy the following equation:

$$CF_{updated} = CF_{prev} + T3,$$

where $CF_{prev}$ is the previous value of the correction field 340 and T3 is the timestamp T3. That is, the correction field 340 of the DELAY_RSP_FOLLOW_UP packet 122 is updated into include the timestamp T3. In an exemplary embodiment, the updating of the correction field 340 can include updating one or more checksum (e.g., cyclic redundancy check) values that are included in the header and/or packet.

Alternatively, in exemplary embodiments where the timestamp T2 has not been included in the DELAY_RSP packet 120, the PHY 410 can be configured to update the value of correction field 340 to satisfy the following equation:

$$CF_{updated} = CF_{prev} + T3 - T2,$$

where T2 is the timestamp T2, and again, $CF_{prev}$ is the previous value of the correction is, field 340 and T3 is the timestamp T3. That the correction field 340 of the DELAY_RSP_FOLLOW_UP packet 122 is updated into include timestamp T3 and timestamp T2 as the turnaround time (e.g., T3-T2). In an exemplary embodiment, the updating of the correction field 340 can include updating one or more checksum (e.g., cyclic redundancy check) values that are included in the header and/or packet.

In an exemplary embodiment, the PHY 410 can be configured to retrieve the timestamp T3 from, for example, timestamp memory 442 based on one or more parameters and/or packet attributes associated with the DELAY_RSP packet 120 and the associated timestamp T3—such as, for example, the source IP address, the destination IP address, the destination MAC address, the sequence ID, and/or the domain number corresponding to the DELAY_RSP packet 120. That is, because the T3 timestamp was indexed during storage of the timestamp T3 based upon one or more of these parameters, the stored timestamp T3 can be retrieved from the timestamp memory 442 based on one or more of these parameters by the PHY 410 (e.g., by the timestamp insert and packet detection device 438).

After step 508, the method of flowchart 500 transitions to step 510, where the peer node 202.1 transmits follow-up response packet (e.g., DELAY_RSP_FOLLOW_UP packet 122) to the peer node 202.2. In this example, the DELAY_RSP_FOLLOW_UP packet 122 can include the timestamp T3 (and/or timestamp T2) without requiring the peer node 202.1 to utilize one more of host interfaces (e.g., MDIO) to retrieve the timestamps T3 (and/or T2) for the generation of a follow-up response packet. In an exemplary embodiment, the PHY 410 can be configured to remove the previously inserted timestamp retrieval command(s) from the reserved field(s) of the DELAY_RSP_FOLLOW_UP packet 122 prior to transmission of the DELAY_RSP_FOLLOW_UP packet 122.

Upon reception of the follow-up response packet (e.g., DELAY_RSP_FOLLOW_UP packet 122) by the peer node 202.2, the peer node 202.2 can be configured to generate a timestamp (e.g., timestamp T4) corresponding to the ingress of the follow-up response packet (e.g., DELAY_RSP_FOLLOW_UP packet 122) at the peer node 202.2.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

In the prior description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; or other hardware devices. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Abstract section, is intended to be used to interpret the claims. The Abstract section may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A synchronization method, comprising:
generating, by a first network entity, an ingress timestamp corresponding to a time at which a first packet is received by the first network entity;
inserting the ingress timestamp in the first packet;
generating, by a precision time protocol (PTP) device of the first network entity, a second packet in response to the first packet, wherein the second packet includes a timestamp generation command;
generating, by a network physical layer (PHY) of the first network entity, an egress timestamp responsive to the timestamp generation command, the egress time stamp corresponding to a time at which the second packet is transmitted by the network PHY of the first network entity;
inserting, by the network PHY of the first network entity, the egress timestamp into a third packet; and
transmitting, by the network PHY of the first network entity, the third packet to a second network entity.

2. The method of claim 1, wherein the timestamp generation command is included in a reserved field of a header of the second packet.

3. The method of claim 1, wherein the generating of the egress timestamp includes analyzing the second packet during the transmission of the second packet to identify an inclusion of the timestamp generation command within the second packet.

4. The method of claim 3, wherein the generating of the egress timestamp is in response to the identification of the timestamp generation command being included in the second packet.

5. The method of claim 1, wherein the inserting of the ingress timestamp in the first packet comprises:
writing the ingress timestamp in a reserved field of a header of the first packet.

6. The method of claim 1, further comprising:
generating the third packet, wherein the third packet includes a timestamp retrieval command.

7. The method of claim 6, wherein the timestamp retrieval command is included in a reserved field of a header of the third packet.

8. The method of claim 6, wherein the inserting the egress timestamp into the third packet comprises:
analyzing the third packet during the transmission of the third packet to identify an inclusion of the timestamp retrieval command within the third packet; and
inserting the egress timestamp into the third packet based on the analysis of the third packet.

9. The method of claim 8, wherein the analyzing the third packet comprises:
determining whether a first reserved field of a header of the third packet includes an enabled command; and
determining whether a second reserved field of the header of the third packet includes the timestamp retrieval command.

10. The method of claim 1, wherein the first packet is a delay request packet, the second packet is a delay response packet, and the third packet is a delay response follow up packet, and wherein the delay request packet, the delay response packet, and the delay response follow up packet conforms to a Precision Time Protocol (PTP).

11. The method of claim 1, wherein the network PHY includes a physical interface coupled to a communication medium, the physical interface configured to transmit or receive one or more packets over the communication medium.

12. A communication device, comprising:
a precision time protocol (PTP) device that is configured to:
insert an ingress timestamp in a first packet received by the communication device;
generate a second packet in response to the received first packet, the second packet including a timestamp generation command; and
generate a third packet; and
a network physical layer (PHY) that is configured to:
transmit the second packet to a network entity;
generate, responsive to the timestamp generation command, an egress timestamp upon transmission of the second packet, the egress timestamp corresponding to a time at which the second packet is transmitted to the network entity;
insert the egress timestamp into the third packet; and
transmit the third packet including the inserted egress timestamp to the network entity.

13. The communication device of claim 12, wherein the network PHY is further configured to generate the ingress timestamp corresponding to a time at which the first packet is received by the communication device.

14. The communication device of claim 12, wherein the PTP device is further configured to insert the timestamp generation command in a reserved field of a header of the second packet.

15. The communication device of claim 12, wherein the PTP device is further configured to insert a timestamp retrieval command in a reserved field of a header of the third packet.

16. The communication device of claim 15, wherein the network PHY is further configured to insert the egress timestamp into the third packet based on the inserted timestamp retrieval command.

17. The communication device of claim 12, wherein the network PHY includes a physical interface coupled to a communication medium, the physical interface configured to transmit or receive one or more packets over the communication medium.

18. A communication device, comprising:
    a precision time protocol (PTP) device that is configured to:
        insert an ingress timestamp in a first packet received by the communication device;
        generate a second packet in response to the received first packet, the second packet including a timestamp generation command in a reserved field of a header of the second packet; and
        generate a third packet including a timestamp retrieval command in a reserved field of a header of the third packet; and
    a network physical layer (PHY) that is configured to:
        transmit the second packet to a network entity;
        generate an egress timestamp upon transmission of the second packet based on the timestamp generation command, the egress timestamp corresponding to a time at which the second packet is transmitted to the network entity;
        insert the egress timestamp into the third packet based on the timestamp retrieval command; and
        transmit the third packet including the inserted egress timestamp to the network entity.

19. The communication device of claim 18, wherein the network PHY includes a physical interface coupled to a communication medium, the physical interface configured to transmit or receive one or more packets over the communication medium.

* * * * *